United States Patent
Li et al.

(10) Patent No.: US 11,320,026 B2
(45) Date of Patent: May 3, 2022

(54) TRANSMISSION, POWER-DRIVEN SYSTEM, AND VEHICLE

(71) Applicant: BYD COMPANY LIMITED, Guangdong (CN)

(72) Inventors: Zhenyang Li, Shenzhen (CN); Jilong Chen, Shenzhen (CN); Cailin Fu, Shenzhen (CN)

(73) Assignee: BYD COMPANY LIMITED, Guangdong (CN)

(*) Notice: Subject to any disclaimer, the term of this patent is extended or adjusted under 35 U.S.C. 154(b) by 0 days.

(21) Appl. No.: 17/256,540

(22) PCT Filed: Jun. 28, 2019

(86) PCT No.: PCT/CN2019/093560
§ 371 (c)(1),
(2) Date: Dec. 28, 2020

(87) PCT Pub. No.: WO2020/001588
PCT Pub. Date: Jan. 2, 2020

(65) Prior Publication Data
US 2021/0254687 A1    Aug. 19, 2021

(30) Foreign Application Priority Data

Jun. 29, 2018  (CN) .......................... 201810714182.7

(51) Int. Cl.
*F16H 3/78* (2006.01)
*B60K 1/00* (2006.01)

(52) U.S. Cl.
CPC .............. *F16H 3/78* (2013.01); *B60K 1/00* (2013.01); *F16H 2200/0021* (2013.01);
(Continued)

(58) Field of Classification Search
CPC ..... F16H 2200/2007; F16H 2200/2035; F16H 2200/0043; F16H 2200/2064; F16H 2200/2094; F16H 3/78
See application file for complete search history.

(56) References Cited

U.S. PATENT DOCUMENTS 6,764,425 B2 * 7/2004 Lee .......................... F16H 3/666
                                                                475/280
8,512,187 B2 * 8/2013 Puiu ....................... B60W 20/30
                                                                475/5
(Continued)

FOREIGN PATENT DOCUMENTS

CN    105402334 A    3/2016
CN    107013633 A    8/2017
(Continued)

OTHER PUBLICATIONS

International Search Report from PCT/CN2019/093560 dated Oct. 11, 2019 (2 pages).

*Primary Examiner* — Ernesto A Suarez
*Assistant Examiner* — James J Taylor, II
(74) *Attorney, Agent, or Firm* — Calfee Halter & Griswold LLP

(57) ABSTRACT

A transmission, a power-driven system, and a vehicle are provided. The transmission includes a first planetary gear mechanism, a second planetary gear mechanism, an input shaft, an intermediate shaft, a first synchronizer, and a second synchronizer. A second planet carrier in the second planetary gear mechanism is connected to an output end of the transmission. The input shaft is connected to a first sun gear. A first ring gear is connected to the intermediate shaft. The intermediate shaft is connected to a second sun gear. The first synchronizer secures a first planet carrier to a housing of the transmission or connects the first planet carrier to the first sun gear. The second synchronizer secures (Continued)

a second ring gear to the housing of the transmission or connects the second ring gear to the first ring gear.

19 Claims, 1 Drawing Sheet

(52) U.S. Cl.
CPC .............. *F16H 2200/0043* (2013.01); *F16H 2200/2007* (2013.01); *F16H 2200/2035* (2013.01)

(56) References Cited

U.S. PATENT DOCUMENTS

| | | | |
|---|---|---|---|
| 9,353,832 B1* | 5/2016 | Hsia | F16H 3/64 |
| 10,195,932 B2* | 2/2019 | Brehmer | B60K 6/44 |
| 2019/0162274 A1* | 5/2019 | Beck | F16H 3/66 |

FOREIGN PATENT DOCUMENTS

| | | |
|---|---|---|
| JP | 2015190544 A | 11/2015 |
| WO | 2016108299 A1 | 7/2016 |

* cited by examiner

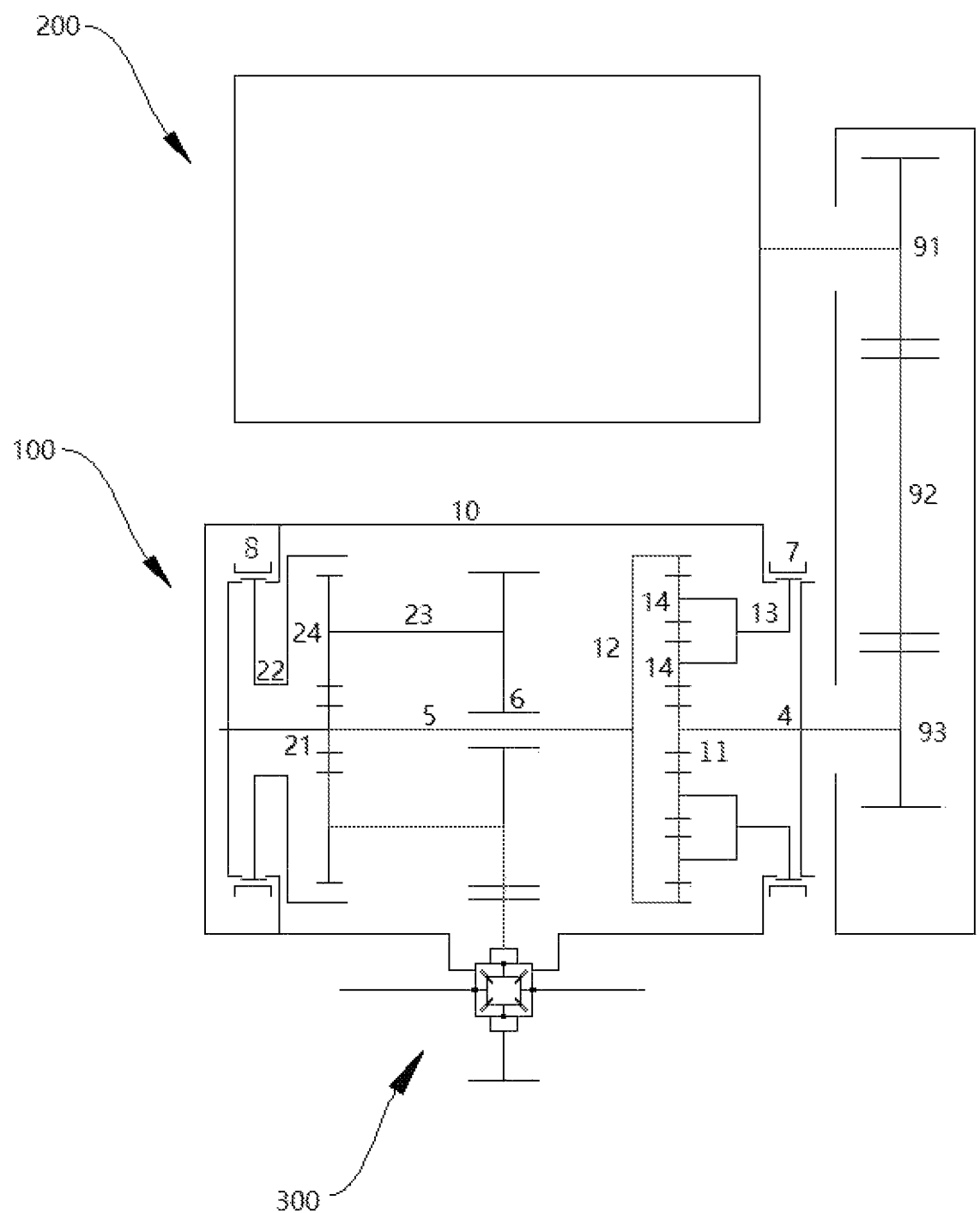

TRANSMISSION, POWER-DRIVEN SYSTEM, AND VEHICLE

CROSS-REFERENCE TO RELATED APPLICATIONS

This application is the National Phase of International Application No. PCT/CN2019/093560, filed on Jun. 28, 2019, which is based on and claims priority to Chinese Patent Application No. 201810714182.7, filed with the National Intellectual Property Administration, PRC on Jun. 29, 2018 and entitled "TRANSMISSION, POWER-DRIVEN SYSTEM, AND VEHICLE", which is incorporated herein by reference in its entirety.

FIELD

This application relates to the field of vehicle manufacturing technologies, and specifically, to a transmission, a power-driven system, and a vehicle.

BACKGROUND

Hybrid electric vehicles, electric vehicles, and extended-range electric vehicles are directions for future development of vehicles and also main forms of alternative fuel vehicles. In the related art, the structure and operation mode of a power transmission system are complex, control policy is cumbersome, and the energy conversion efficiency needs to be improved. Consequently, the kinetic energy of an engine and the electric energy of a battery cannot be used in full potential. There are problems of second-time energy conversion, complex control, and low efficiency. Specifically, in the related art, a disk clutch and a disk brake of a vehicle control the gear shift. However, when the two components do not work, there is drag torque due to lubrication, causing not-high efficiency of an entire transmission.

In addition, most of multi-gear transmissions in the related art select a gear through a shifting yoke and a sliding sleeve when a clutch cuts off the power. There are a relatively large number of pairs of gears which occupy much space, and the structure is complex. Therefore, there is space for improvement.

SUMMARY

This application aims to resolve at least one of the technical problems existing in the prior art. Therefore, one objective of this application is to provide a transmission with high efficiency, a simple structure, and a steady gear shift.

The transmission according to this application includes: a first planetary gear mechanism, where the first planetary gear mechanism includes a first sun gear, a first planetary gear, a first planet carrier, and a first ring gear; a second planetary gear mechanism, where the second planetary gear mechanism includes a second sun gear, a second planetary gear, a second planet carrier, and a second ring gear, and the second planet carrier is connected to an output end of the transmission; an input shaft, where the input shaft is connected to the first sun gear; an intermediate shaft, where the first ring gear is connected to the intermediate shaft, and the intermediate shaft is connected to the second sun gear; a first synchronizer, where the first synchronizer secures the first planet carrier to a housing of the transmission or connects the first planet carrier to the first sun gear; and a second synchronizer, where the second synchronizer secures the second ring gear to the housing of the transmission or connects the second ring gear to the first ring gear.

According to this application, through the transmission in which a dual-planetary-dual-synchronizer structure is disposed, a quick, smooth, and reliable gear shift can be implemented. Besides, the structure of the transmission is simple, facilitating the maintenance.

A power-driven system according to this application is provided, including a driving motor and the transmission according to this application, where the driving motor and the input shaft are in power coupling connection.

The power-driven system according to this application is provided with the transmission according to this application, and therefore has corresponding advantages. Details are not repeated herein.

A vehicle according to this application includes the power-driven system according to this application.

The vehicle according to this application is provided with the power-driven system according to this application, and therefore has the same advantage relative to the prior art, and details are not repeated herein.

Other aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description made with reference to the following accompanying drawings, where:

FIG. 1 is a schematic structural diagram of a transmission according to an embodiment of this application.

REFERENCE NUMERALS transmission 100; housing 10;
first sun gear 11; first ring gear 12; first planet carrier 13; first planetary gear 14;
second sun gear 21; second ring gear 22; second planet carrier 23; second planetary gear 24;
input shaft 4; intermediate shaft 5; output gear 6;
first synchronizer 7; second synchronizer 8;
driving gear 91; idle gear 92; driven gear 93;
driving motor 200; and differential 300.

DETAILED DESCRIPTION

Embodiments of this application are described in detail below, and examples of the embodiments are shown in the accompanying drawings, wherein the same or similar elements or the elements having same or similar functions are denoted by the same or similar reference numerals throughout the description. The embodiments described below with reference to the accompanying drawings are exemplary and used only for explaining this application, and should not be construed as a limitation on this application.

A transmission 100 according to an embodiment of this application is described below with reference to FIG. 1.

As shown in FIG. 1, the transmission 100 according to this embodiment of this application includes: a first planetary gear mechanism, a second planetary gear mechanism, an input shaft 4, an intermediate shaft 5, a first synchronizer 7, and a second synchronizer 8.

Torque of a vehicle may be inputted into the transmission 100 through the input shaft 4. The torque in the transmission 100 may be finally outputted from an output end of the transmission 100 through the first planetary gear mechanism and the second planetary gear mechanism. The synchronizer is configured to connect all components in the transmission 100 for a gear shift.

The first planetary gear mechanism may include a plurality of first planetary gears 14. The plurality of first planetary gears 14 are connected to a first planet carrier 13. The second planetary gear mechanism may include a plurality of second planetary gears 24. The plurality of second planetary gears 24 are connected to a second planet carrier 23. When a sun gear in each planetary gear mechanism rotates, each sun gear can drive a corresponding planetary gear to rotate, and a planet carrier corresponding to the planetary gear may rotate selectively. When a ring gear is fixed, and the planet carrier is not fixed, the sun gear inputs, and the planetary gear rotates and drives the planet carrier to input; when the planet carrier is fixed, and the ring gear is not fixed, the sun gear inputs, and the planetary gear rotates and drives the ring gear to input; when both the planet carrier and the ring gear are not fixed, the sun gear and the ring gear input, and the planetary gear rotates and drives the planet carrier to input; or when both the planet carrier and the ring gear are not fixed, the sun gear and the planet carrier input, and the planetary gear rotates and drives the ring gear to input.

The first planetary gear mechanism includes a first sun gear 11, a first planetary gear 14, a first planet carrier 13, and a first ring gear 12. In this way, when the torque is transmitted in the first planetary gear mechanism, the torque may be inputted from the first sun gear 11 and/or the first planet carrier 13, and outputted into the intermediate shaft 5 through the first ring gear 12.

The second planetary gear mechanism includes a second sun gear 21, a second planetary gear 24, a second planet carrier 23, and a second ring gear 22. The second planet carrier 23 is connected to an output end of the transmission 100. In this way, when the torque is transmitted in the second planetary gear mechanism, the torque may be inputted from the second sun gear 21, or may be inputted from the second sun gear 21 and the second ring gear 22, and outputted from the second planet carrier 23 to the output end of the transmission 100, and is finally outputted out of the transmission 100.

The input shaft 4 is connected to the first sun gear 11. The first ring gear 12 is connected to the intermediate shaft 5. The intermediate shaft 5 is connected to the second sun gear 21. In the first planetary gear mechanism, the torque may be inputted from the first sun gear 11, transmitted from the first ring gear 12 to the intermediate shaft 5, and then transmitted to the second sun gear 21 of the second planetary gear mechanism through the intermediate shaft 5.

The first synchronizer 7 secures the first planet carrier 13 to a housing 10 of the transmission 100, or connects the first planet carrier 13 to the first sun gear 11: when the first synchronizer 7 secures the first planet carrier 13 to the housing 10 of the transmission 100, the torque may be inputted from the input shaft 4 into the first planetary gear mechanism through the first sun gear 11, and outputted into the intermediate shaft 5 through the first ring gear 12; or when the first synchronizer 7 connects the first planet carrier 13 to the first sun gear 11, the torque may be inputted from the input shaft 4 into the first planetary gear mechanism through the first sun gear 11 and the first planet carrier 13, and outputted into the intermediate shaft 5 through the first ring gear 12.

The second synchronizer 8 secures the second ring gear 22 to the housing 10 of the transmission 100, or connects the second ring gear 22 to the first ring gear 12: when the second synchronizer 8 secures the second ring gear 22 to the housing 10 of the transmission 100, the torque may be inputted from the intermediate shaft 5 into the second planetary gear mechanism through the second sun gear 21, and outputted into the output end of the transmission 100 through the second planet carrier 23; or when the second synchronizer 8 connects the second ring gear 22 to the first ring gear 12, the torque may be inputted from the first ring gear 12 into the second planetary gear mechanism through the intermediate shaft 5, the second sun gear 21, and the second ring gear 22, and outputted into the output end of the transmission 100 through the second planet carrier 23.

In terms of braking, the first synchronizer 7 and the second synchronizer 8 are used (that is, in a dual-synchronizer manner). The first synchronizer 7 can implement connection of the input shaft 4 or the housing 10. The second synchronizer 8 can implement connection of the intermediate shaft 5 or the housing 10. 4-Gear ("2*2") power transmission can be further implemented. Compared with the double-sided clutch used in the prior art, the structure is more compact with a more economical feature. Besides, the assembly weight is reduced.

In some embodiments of this application, through the dual-planetary-dual-synchronizer structure, that is, the first synchronizer 7 and the second synchronizer 8 are disposed in the transmission 100, the gear shift manner is that a motor controls the synchronizer to shift into another gear. Apart from advantages of a simple structure, a quick gear shift, and high efficiency, there is no problem of drag torque caused by a multi-disk clutch and a multi-disk brake. In addition, the cost is lower and maintenance is easier. Using a synchronizer instead of a clutch for a gear shift simplifies the structure of the transmission 100.

According to this embodiment of this application, through the transmission 100 in which a dual-planetary-dual-synchronizer structure is disposed, a quick, smooth, and reliable gear shift can be implemented. Besides, the structure of the transmission 100 is simple, facilitating the maintenance.

Some embodiments of the transmission 100 according to this application are described below with reference to FIG. 1.

In some embodiments, as shown in FIG. 1, the output end of the transmission 100 includes an output gear 6. The output gear 6 is connected to the second planet carrier 23. The torque outputted from the second planetary gear mechanism is transmitted to the output gear 6 and transmitted out of the transmission 100 through the output gear 6. The connection between the second planet carrier 23 and the output gear 6 can change a transmission direction of the outputted torque, reduce the size of the transmission 100 in a direction of an axis of the input shaft 4, and therefore facilitate an arrangement of the transmission 100 in a vehicle.

In some embodiments, as shown in FIG. 1, the axis of the input shaft 4 is coaxial with an axis of the intermediate shaft 5. The output gear 6 is located between the first planetary gear mechanism and the second planetary gear mechanism. The output gear 6 is sleeved outside the intermediate shaft 5. The structure can facilitate an arrangement of the input shaft 4 and the output gear 6, change a direction of the torque transmitted from the input shaft 4 to the output gear 6, reduce the size of the transmission 100 in the direction of the axis of the input shaft 4, and therefore facilitate the arrangement of the transmission 100 in the vehicle.

Certainly, in some other embodiments, the output end of the transmission 100 may include an output shaft. The output shaft is connected to the second planet carrier 23. Besides, an axis of the output shaft is coaxial with the axis of the intermediate shaft 5.

In some embodiment, as shown in FIG. 1, the first synchronizer 7 is located on a side of the first planetary gear mechanism that is away from the second planetary gear mechanism. The second synchronizer 8 is located on a side of the second planetary gear mechanism that is away from the first planetary gear mechanism. That is, the first planetary gear mechanism is arranged between the first synchronizer 7 and the second planetary gear mechanism, and the second planetary gear mechanism is arranged between the second synchronizer 8 and the first planetary gear mechanism. In this way, the distance between the first planetary gear mechanism and the second planetary gear mechanism can be shortened, and the length of the intermediate shaft 5 can be further shortened, so that the stability of the transmission 100 is improved, and the structure of the transmission 100 is made more compact.

In some embodiments, as shown in FIG. 1, one of the first planetary gear mechanism and the second planetary gear mechanism is a single-stage planetary gear mechanism, and the other one of the first planetary gear mechanism and the second planetary gear mechanism is a two-stage planetary gear mechanism. That is, when the first planetary gear mechanism is a single-stage planetary gear mechanism, the second planetary gear mechanism is a two-stage planetary gear mechanism, or when the first planetary gear mechanism is a two-stage planetary gear mechanism, the second planetary gear mechanism is a single-stage planetary gear mechanism.

The single-stage planetary gear mechanism is a planetary gear mechanism in which a sun gear can drive a ring gear merely through a one-stage planetary gear. The single-stage planetary gear mechanism has a simple structure and can effectively improve the transmission efficiency of the torque in the transmission 100. The two-stage planetary gear mechanism is a planetary gear mechanism that includes a two-stage planetary gear. A sun gear can drive a ring gear through the two-stage planetary gear. There are a relatively small number of teeth of a planet carrier in the two-stage planetary gear mechanism. When the planet carrier is fixed, rotation directions of the sun gear and the ring gear are the same.

In some embodiments, as shown in FIG. 1, the transmission according to this application further includes: a driving gear 91, an idle gear 92, and a driven gear 93. The driving gear 91 is engaged with the idle gear 92. The idle gear 92 is engaged with the driven gear 93. The driven gear 93 is connected to the input shaft 4. The torque may be transmitted from a motor or an engine of the vehicle to the input shaft 4 through the driving gear 91, the idle gear 92, and the driven gear 93 sequentially, and transmitted to the first planetary gear mechanism through the input shaft 4. The driving gear 91, the idle gear 92, and the driven gear 93 can change the transmission direction of the torque of the motor or the engine of the vehicle. In this way, the reducer and the motor or the engine of the vehicle can be arranged side by side. That is, an axis of the reducer is parallel with an axis of the motor or the engine. In this way, the length of a power-driven system of the vehicle in an axial direction can be reduced, saving space for power-driven system arrangement in the vehicle. The idle gear 92 is added on an axis of the input shaft 4 and a planetary gear row, and an output position is also shifted to a central position of the transmission 100, so that there is no superposition of the axial length of the driving motor 200 onto the axial length of the reducer 100 in the planetary gear mechanism, making the width of a power-driven apparatus of the vehicle shorter than the width of a vehicle axle.

Embodiments below are described with reference to FIG. 1 by using an example that the first planetary gear mechanism is a two-stage planetary gear mechanism, and the second planetary gear mechanism is a single-stage planetary gear mechanism.

In the first planetary gear mechanism, when the first ring gear of the first planetary gear mechanism outputs, the speed ratio is 2. In this way, inputted high torque is transmitted into the second planetary gear mechanism. Because the a high-speed and low-torque working condition is more suitable for a two-stage planetary gear mechanism, the first planetary gear mechanism is set to a two-stage planetary gear mechanism, to improve the stability of the reducer 100.

If the planetary gear system in the reducer only has one type of planetary gear, when the planet carrier is fixed, the rotation direction of the ring gear is opposite to that of the sun gear. When the ring gear is fixed, the sun gear inputs, and the planet carrier outputs, the speed ratio=1+the number of teeth of the ring gear/the number of teeth of the sun gear, and the speed ration is not less than 3. In this case, to ensure the range, the number of teeth of the ring gear is merely increased and the number of teeth of the sun gear is reduced to make a second-stage speed ratio=6. Consequently, the planetary gear is manufactured extremely cumbersome. Besides, the speed ratio of the first gear is 3*6=18, and the structure is improper. Based on the above, in the transmission, the design that one of the two planetary gear mechanisms is a single-stage planetary gear mechanism, and the other is a two-stage planetary gear mechanism is more proper, thereby improving the stability of the transmission 100. In some embodiments, the transmission 100 according to the embodiments of this application can have 4 gears, that is, a first gear, a second gear, a third gear, and a fourth gear. The speed ratio from the first gear to the fourth gear declines progressively, that is, the speed ratio u1 of the first gear>the speed ratio u2 of the second gear>the speed ratio u3 of the third gear>the speed ratio u4 of the fourth gear.

In some examples, the first planetary gear mechanism uses the first ring gear for output, the speed ratio≈2, and the second planetary gear mechanism uses the second planet carrier for output, speed ratio≈4. Therefore, in the reduction structure, the speed ratio u1 of the first gear=8, the speed ratio u2 of the second gear=4, the speed ratio u3 of the third gear=2, the speed ratio u4 of the fourth gear=1, and the range is 2.

In the transmission 100 according to this embodiment of this application, the first synchronizer 7 and the second synchronizer 8 are disposed to render a four-gear gear shift structure in the transmission 100. For a medium-sized truck and a heavy truck with a requirement for a large torque range, an indeterminate load, and a complex wording condition, the four-gear gear shift structure ensures the operation of a motor in a high efficiency area, and saves electric energy. Using a synchronizer instead of a clutch for a gear shift simplifies the structure.

Working states of the first synchronizer 7 and the second synchronizer 8 in each gear in the transmission 100 and a transmission path of the torque transmitted from the input shaft 4 to the output gear 6 in the transmission 100 are described below with reference to FIG. 1.

In the following, reference is made to FIG. 1 for the position of each synchronizer in a gear shift. Certainly, the arrangement direction and arrange position of each synchronizer are not limited thereto.

When the transmission 100 shifts into the first gear, the first synchronizer 7 secures the housing 10 of the transmission 100 to the first planet carrier 13, and the second synchronizer 8 secures the second ring gear 22 to the housing 10 of the transmission 100.

In this way, the torque is transmitted from the input shaft 4 to the transmission 100. The input shaft 4 transmits the torque to the first sun gear 11. Because the first planet carrier 13 is secured to the housing 10 of the transmission 100, the torque is outputted to the intermediate shaft 5 by the first ring gear 12 in the first planetary gear mechanism. Then the torque is transmitted to the second sun gear 21 through the intermediate shaft 5. In the second planetary gear mechanism, the torque transmitted to the second planetary gear mechanism is inputted from the second sun gear 21 and outputted from the second planet carrier 23. The second planet carrier 23 transmits the torque to the output gear 6.

Therefore, when the transmission 100 is in the first gear, in the first planetary gear mechanism, the torque is inputted from the first sun gear 11, and outputted to the intermediate shaft 5 by the first ring gear 12. At this time, the rotation direction of torque is the same as that of the input shaft 4 and the rotation speed declines. The torque is transmitted into the second planetary gear mechanism through the intermediate shaft 5, inputted from the second sun gear 21, and outputted to the output gear 6 by the second planet carrier 23. The rotation direction of the torque when the torque is transmitted through the second planetary gear mechanism is the same as the rotation direction of the input shaft 4, and the speed declines again. When in the first gear, after being transmitted from the input shaft 4 to the transmission 100, the torque is transmitted out of the transmission 100 after double speed reductions in the first planetary gear mechanism and the second planetary gear mechanism. The torque transmission direction of the input shaft 4 and the output gear 6 remains unchanged.

When the transmission 100 shifts into the second gear, the first synchronizer 7 connects the first sun gear 11 to the first planet carrier 13, and the second synchronizer 8 secures the second ring gear 22 to the housing 10 of the transmission 100.

In this way, the torque is transmitted from the input shaft 4 to the transmission 100. The input shaft 4 transmits the torque to the first sun gear 11 and the first planet carrier 13. In the first planetary gear mechanism, the torque is inputted from the first planet carrier 13 and the first sun gear 11, outputted from the first ring gear 12, and transmitted to the intermediate shaft 5. In the second planetary gear mechanism, the torque transmitted to the second planetary gear mechanism is inputted from the second sun gear 21 and outputted from the second planet carrier 23. The second planet carrier 23 transmits the torque to the output gear 6.

Therefore, when the transmission 100 is in the second gear, in the first planetary gear mechanism, the torque is inputted from the first planet carrier 13 and the first sun gear 11, outputted from the first ring gear 12, and transmitted to the intermediate shaft 5. At this time, the rotation direction of torque is the same as that of the input shaft 4 and the rotation speed declines. The torque is transmitted to the second sun gear 21 in the second planetary gear mechanism through the intermediate shaft 5. In the second planetary gear mechanism, the torque is inputted from the second sun gear 21, and outputted from the second planet carrier 23 to the output gear 6. At this time, the rotation direction of torque is the same as that of the input shaft 4 and the rotation speed declines. When in the second gear, after being transmitted to the transmission 100 from the input shaft 4, the torque is transmitted out of the transmission 100 after double speed reductions in the first planetary gear mechanism and the second planetary gear mechanism. The torque transmission direction of the input shaft 4 and the output gear 6 remains unchanged. In the first gear, an input end of the first planetary gear mechanism is the first sun gear 11. However, in the second gear, the input end of the first planetary gear mechanism is the first sun gear 11 and the first planet carrier 13. Therefore, compared with that in the first gear, when the rotation speed of the input shaft 4 is constant, the outputted rotation speed of the transmission 100 is higher in the second gear, to make the speed ratio u1 of the first gear>the speed ratio u2 of the second gear.

When the transmission 100 shifts into the third gear, the first synchronizer 7 secures the housing 10 of the transmission 100 to the first planet carrier 13, and the second synchronizer 8 connects the second ring gear 22 to the first ring gear 12.

In this way, the torque is transmitted from the input shaft 4 to the transmission 100. The input shaft 4 transmits the torque to the first sun gear 11. Because the first planet carrier 13 is secured to the housing 10 of the transmission 100, the torque is outputted to the intermediate shaft 5 by the first ring gear 12 in the first planetary gear mechanism. Then the torque is transmitted to the second sun gear 21 through the intermediate shaft 5. In the second planetary gear mechanism, the torque transmitted to the second planetary gear mechanism is inputted from the second sun gear 21 and the second ring gear 22 and outputted from the second planet carrier 23. The second planet carrier 23 transmits the torque to the output gear 6.

Therefore, when the transmission 100 is in the third gear, in the first planetary gear mechanism, the torque is inputted from the first sun gear 11, and outputted to the intermediate shaft 5 by the first ring gear 12. At this time, the rotation direction of torque is the same as that of the input shaft 4 and the rotation speed declines. The torque is transmitted into the second planetary gear mechanism through the intermediate shaft 5, inputted from the second sun gear 21 and the second ring gear 22, and outputted to the output gear 6 by the second planet carrier 23. The rotation direction of the torque when the torque is transmitted through the second planetary gear mechanism is the same as the rotation direction of the input shaft 4, and the speed declines again. When in the third gear, after being transmitted from the input shaft 4 to the transmission 100, the torque is transmitted out of the transmission 100 after double speed reduction in the first planetary gear mechanism and the second planetary gear mechanism. The torque transmission direction of the input shaft 4 and the output gear 6 remains unchanged. Compared with that in the second gear, when the transmission 100 is in the third gear, the first planetary gear mechanism and the second planetary gear mechanism may be designed as that when the rotation speed of the input shaft 4 is constant, the rotation speed of the output gear 6 in the third gear is higher than the rotation speed of the output gear 6 in the second gear, to make the speed ratio u2 of the second gear>speed ratio u3 of the third gear.

When the transmission 100 shifts into the fourth gear, the first synchronizer 7 connects the first sun gear 11 to the first planet carrier 13, and the second synchronizer 8 connects the second ring gear 22 to the first ring gear 12.

In this way, the torque is transmitted from the input shaft 4 to the transmission 100. The input shaft 4 transmits the torque to the first sun gear 11 and the first planet carrier 13. In the first planetary gear mechanism, the torque is inputted from the first planet carrier 13 and the first sun gear 11, outputted from the first ring gear 12, and transmitted to the intermediate shaft 5. In the second planetary gear mechanism, the torque transmitted to the second planetary gear mechanism is inputted from the second sun gear 21 and the second ring gear 22 and outputted from the second planet carrier 23. The second planet carrier 23 transmits the torque to the output gear 6.

Therefore, when the transmission 100 is in the fourth gear, in the first planetary gear mechanism, the torque is inputted from the first planet carrier 13 and the first sun gear 11, outputted from the first ring gear 12, and transmitted to the intermediate shaft 5. At this time, the rotation direction of torque is the same as that of the input shaft 4 and the rotation speed declines. The torque is transmitted to the second sun gear 21 in the second planetary gear mechanism through the intermediate shaft 5. The torque is also transmitted to the second ring gear 22 of the second planetary gear mechanism through the intermediate shaft 5. In the second planetary gear mechanism, the torque is inputted from the second sun gear 21 and the second ring gear 22, and outputted from the second planet carrier 23 to the output gear 6. At this time, the rotation direction of torque is the same as that of the input shaft 4 and the rotation speed declines. When in the fourth gear, after being transmitted to the transmission 100 from the input shaft 4, the torque is transmitted out of the transmission 100 after double speed reductions in the first planetary gear mechanism and the second planetary gear mechanism. The torque transmission direction of the input shaft 4 and the output gear 6 remains unchanged. In the third gear, an input end of the first planetary gear mechanism is the first sun gear 11. However, in the fourth gear, the input end of the first planetary gear mechanism is the first sun gear 11 and the first planet carrier 13. Therefore, compared with that in the third gear, when the rotation speed of the input shaft 4 is constant, the outputted rotation speed of the transmission 100 is higher in the fourth gear, to make the speed ratio u3 of the third gear>the speed ratio u4 of the fourth gear.

Based on the above, the transmission 100 according to this application uses a dual-planetary-dual-synchronizer structure. The gear shift manner may be that a motor controls a synchronizer to shift into another gear. Apart from advantages of a simple structure, a quick gear shift, and high efficiency of torque, there is no problem of drag torque caused by a multi-disk clutch and a multi-disk brake. In addition, the transmission 100 has advantages of lower manufacturing costs and easier maintenance.

Using a synchronizer instead of a clutch for a gear shift simplifies the structure. Besides, the transmission 100 uses a four-gear transmission structure, which can ensure that electric energy is saved when the motor operates in a high efficiency region.

The power-driven system according to an embodiment of this application includes a driving motor 200 and the transmission 100 according to any one of the foregoing embodiments. The driving motor 200 and the input shaft 4 are in power coupling connection. In this way, the power-driven system according to this embodiment of this application is provided with the transmission 100 according to the embodiments of this application, and therefore has advantages of a quick gear shift, high efficiency of torque transmission, and a smooth gear shift. Besides, the structure of the power-driven system is simple.

In some embodiments, as shown in FIG. 1, when the transmission 100 is the transmission 100 that includes the driving gear 91, the idle gear 92, and the driven gear 93, the driving motor 200 is connected to the driving gear 91. Both the driving motor 200 and the first planetary gear mechanism are arranged on the same side of the driving gear 91. Besides, the driving motor 200 may be arranged in parallel with the axis of the input shaft 4. That is, the driving motor 200 and the transmission 100 may be arranged side by side. In this way, the length of a power-driven system in an axial direction can be reduced, saving space for power-driven system arrangement in the vehicle.

A vehicle according to an embodiment of this application includes the power-driven system according to the foregoing embodiment. The vehicle is provided with the power-driven system, and therefore has advantages of a steady gear shift, a quick gear shift, and high efficiency of torque transmission, and also has advantages of a large range of outputted torque, a steady load, a capability of dealing with a complex road condition, and energy conservation. In some embodiments, the vehicle according to this application may be an electric vehicle or a hybrid electric vehicle.

In some embodiments, as shown in FIG. 1, the vehicle may further include a differential 300. An input end of the differential 300 is connected to the output end of the reducer. In this way, the torque outputted from the transmission 100 can be inputted into the differential 300, and finally drives the wheels of the vehicle to rotate, to implement vehicle traveling.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of this application. In this specification, schematic descriptions of the foregoing terms are not necessarily directed at a same embodiment or example. Moreover, the specific features, structures, materials, or characteristics described may be combined in any one or more embodiments or examples in an appropriate manner.

Although the embodiments of this application have been shown and described, a person of ordinary skill in the art should understand that various changes, modifications, replacements and variations may be made to the embodiments without departing from the principles and spirit of this application, and the scope of this application is as defined by the appended claims and their equivalents.

This application is to provide a transmission with high efficiency, a simple structure, and a steady gear shift.

This application further provides a power-driven system which includes the foregoing transmission.

This application further provides a vehicle which includes the foregoing power-driven system.

The transmission according to this application includes: a first planetary gear mechanism, where the first planetary gear mechanism includes a first sun gear, a first planetary gear, a first planet carrier, and a first ring gear; a second planetary gear mechanism, where the second planetary gear mechanism includes a second sun gear, a second planetary gear, a second planet carrier, and a second ring gear, and the second planet carrier is connected to an output end of the transmission; an input shaft, where the input shaft is connected to the first sun gear; an intermediate shaft, where the first ring gear is connected to the intermediate shaft, and the intermediate shaft is connected to the second sun gear; a first synchronizer, where the first synchronizer secures the first planet carrier to a housing of the transmission or connects the first planet carrier to the first sun gear; and a second synchronizer, where the second synchronizer secures the second ring gear to the housing of the transmission or connects the second ring gear to the first ring gear.

According to this application, through the transmission in which a dual-planetary-dual-synchronizer structure is disposed, a quick, smooth, and reliable gear shift can be implemented. Besides, the structure of the transmission is simple, facilitating the maintenance.

In some embodiments, the output end of the transmission includes an output gear, and the output gear is connected to the second planet carrier.

In some embodiments, the output gear is sleeved outside the intermediate shaft.

In some embodiments, an axis of the input shaft is coaxial with an axis of the intermediate shaft, and the output gear is located between the first planetary gear mechanism and the second planetary gear mechanism.

In some embodiments, the first planetary gear mechanism is arranged between the first synchronizer and the second planetary gear mechanism, and the second planetary gear mechanism is arranged between the second synchronizer and the first planetary gear mechanism.

In some embodiments, one of the first planetary gear mechanism and the second planetary gear mechanism is a single-stage planetary gear mechanism, and the other one of the first planetary gear mechanism and the second planetary gear mechanism is a two-stage planetary gear mechanism.

In some embodiments, the transmission according to this application further includes a driving gear, an idle gear, and a driven gear, where the driving gear is engaged with the idle gear, the idle gear is engaged with the driven gear, and the driven gear is connected to the input shaft.

In some embodiments, when the transmission shifts into a first gear, the first synchronizer secures the housing of the transmission to the first planet carrier, and the second synchronizer secures the second ring gear to the housing of the transmission.

In some embodiments, when the transmission shifts into a second gear, the first synchronizer connects the first sun gear to the first planet carrier, and the second synchronizer secures the second ring gear to the housing of the transmission.

In some embodiments, when the transmission shifts into a third gear, the first synchronizer secures the housing of the transmission to the first planet carrier, and the second synchronizer connects the second ring gear to the first ring gear.

In some embodiments, when the transmission shifts into a fourth gear, the first synchronizer connects the first sun gear to the first planet carrier, and the second synchronizer connects the second ring gear to the first ring gear.

A power-driven system according to this application is provided, including a driving motor and the transmission according to this application, where the driving motor and the input shaft are in power coupling connection.

The power-driven system according to this application is provided with the transmission according to this application, and therefore has corresponding advantages. Details are not repeated herein.

In some embodiments, the transmission is a transmission including a driving gear, an idle gear, and a driven gear. Both the driving motor and the first planetary gear mechanism are arranged on the same side of the driving gear.

A vehicle according to this application includes the power-driven system according to this application.

The vehicle according to this application is provided with the power-driven system according to this application, and therefore has the same advantage relative to the prior art, and details are not repeated herein.

Additional aspects and advantages of embodiments of this application will be given in part in the descriptions in this application, become apparent in part from the descriptions in this application, or be learned from the practice of the embodiments of this application.

What is claimed is:

1. A transmission, comprising:
   a first planetary gear mechanism, wherein the first planetary gear mechanism comprises a first sun gear, a first planetary gear, a first planet carrier, and a first ring gear;
   a second planetary gear mechanism, wherein the second planetary gear mechanism comprises a second sun gear, a second planetary gear, a second planet carrier, and a second ring gear, and the second planet carrier is connected to an output end of the transmission;
   an input shaft, wherein the input shaft is connected to the first sun gear;
   an intermediate shaft, wherein the first ring gear is connected to the intermediate shaft, and the intermediate shaft is connected to the second sun gear;
   a first synchronizer, wherein the first synchronizer is moveable between a first position and a second position, wherein the first synchronizer secures the first planet carrier to a housing of the transmission in the first position and connects the first planet carrier to the first sun gear in the second position; and
   a second synchronizer, wherein the second synchronizer is moveable between a third position and a fourth position, wherein the second synchronizer secures the second ring gear to the housing of the transmission in the third position and connects the second ring gear to the first ring gear in the fourth position.

2. The transmission according to claim 1, wherein the output end of the transmission comprises an output gear, and the output gear is connected to the second planet carrier.

3. The transmission according to claim 2, wherein the output gear is sleeved outside the intermediate shaft.

4. The transmission according to claim 3, wherein an axis of the input shaft is coaxial with an axis of the intermediate shaft, and the output gear is located between the first planetary gear mechanism and the second planetary gear mechanism.

5. The transmission according to claim 1, wherein the first planetary gear mechanism is arranged between the first synchronizer and the second planetary gear mechanism, and the second planetary gear mechanism is arranged between the second synchronizer and the first planetary gear mechanism.

6. The transmission according to claim 1, wherein one of the first planetary gear mechanism and the second planetary gear mechanism is a single-stage planetary gear mechanism, and the other one is a two-stage planetary gear mechanism.

7. The transmission according to claim 1, further comprising a driving gear, an idle gear, and a driven gear, wherein the driving gear is engaged with the idle gear, the idle gear is engaged with the driven gear, and the driven gear is connected to the input shaft.

8. The transmission according to claim 1, wherein when the transmission shifts into a first gear, the first synchronizer secures the housing of the transmission to the first planet carrier, and the second synchronizer secures the second ring gear to the housing of the transmission.

9. The transmission according to claim 8, wherein when the transmission shifts into a second gear, the first synchronizer connects the first sun gear to the first planet carrier, and the second synchronizer secures the second ring gear to the housing of the transmission.

10. The transmission according to claim 9, wherein when the transmission shifts into a third gear, the first synchronizer secures the housing of the transmission to the first planet carrier, and the second synchronizer connects the second ring gear to the first ring gear.

11. The transmission according to claim 10, wherein when the transmission shifts into a fourth gear, the first synchronizer connects the first sun gear to the first planet carrier, and the second synchronizer connects the second ring gear to the first ring gear.

12. A power-driven system, comprising:
a driving motor; and
a transmission , wherein the transmission comprising:
a first planetary gear mechanism, wherein the first planetary gear mechanism comprises a first sun gear, a first planetary gear, a first planet carrier, and a first ring gear;
a second planetary gear mechanism, wherein the second planetary gear mechanism comprises a second sun gear, a second planetary gear, a second planet carrier, and a second ring gear, and the second planet carrier is connected to an output end of the transmission;
an input shaft, wherein the input shaft is connected to the first sun gear;
an intermediate shaft, wherein the first ring gear is connected to the intermediate shaft, and the intermediate shaft is connected to the second sun gear;
a first synchronizer, wherein the first synchronizer is moveable between a first position and a second position, wherein the first synchronizer secures the first planet carrier to a housing of the transmission in the first position and connects the first planet carrier to the first sun gear in the second position; and
a second synchronizer, wherein the second synchronizer is moveable between a third position and a fourth position, wherein the second synchronizer secures the second ring gear to the housing of the transmission in the third position and connects the second ring gear to the first ring gear in the fourth position, wherein the driving motor and the input shaft are in power coupling connection.

13. The power-driven system according to claim 12, wherein the transmission further comprising a driving gear, an idle gear, and a driven gear, wherein the driving gear is engaged with the idle gear, the idle gear is engaged with the driven gear, and the driven gear is connected to the input shaft, and both the driving motor and the first planetary gear mechanism are arranged on the same side of the driving gear.

14. A vehicle, comprising the power-driven system according to claim 13.

15. A vehicle, comprising the power-driven system according to claim 12.

16. A transmission, comprising:
a first planetary gear mechanism, wherein the first planetary gear mechanism comprises a first sun gear, a first planetary gear, a first planet carrier, and a first ring gear;
a second planetary gear mechanism, wherein the second planetary gear mechanism comprises a second sun gear, a second planetary gear, a second planet carrier, and a second ring gear, and the second planet carrier is connected to an output end of the transmission;
an input shaft, wherein the input shaft is connected to the first sun gear;
an intermediate shaft, wherein the first ring gear is connected to the intermediate shaft, and the intermediate shaft is connected to the second sun gear;
a first synchronizer, wherein the first synchronizer secures the first planet carrier to a housing of the transmission or connects the first planet carrier to the first sun gear; and
a second synchronizer, wherein the second synchronizer secures the second ring gear to the housing of the transmission or connects the second ring gear to the first ring gear; and
wherein when the transmission shifts into a first gear, the first synchronizer secures the housing of the transmission to the first planet carrier, and the second synchronizer secures the second ring gear to the housing of the transmission.

17. The transmission according to claim 16, wherein when the transmission shifts into a second gear, the first synchronizer connects the first sun gear to the first planet carrier, and the second synchronizer secures the second ring gear to the housing of the transmission.

18. The transmission according to claim 16, wherein when the transmission shifts into a third gear, the first synchronizer secures the housing of the transmission to the first planet carrier, and the second synchronizer connects the second ring gear to the first ring gear.

19. The transmission according to claim 16, wherein when the transmission shifts into a fourth gear, the first synchronizer connects the first sun gear to the first planet carrier, and the second synchronizer connects the second ring gear to the first ring gear.

* * * * *